UNITED STATES PATENT OFFICE.

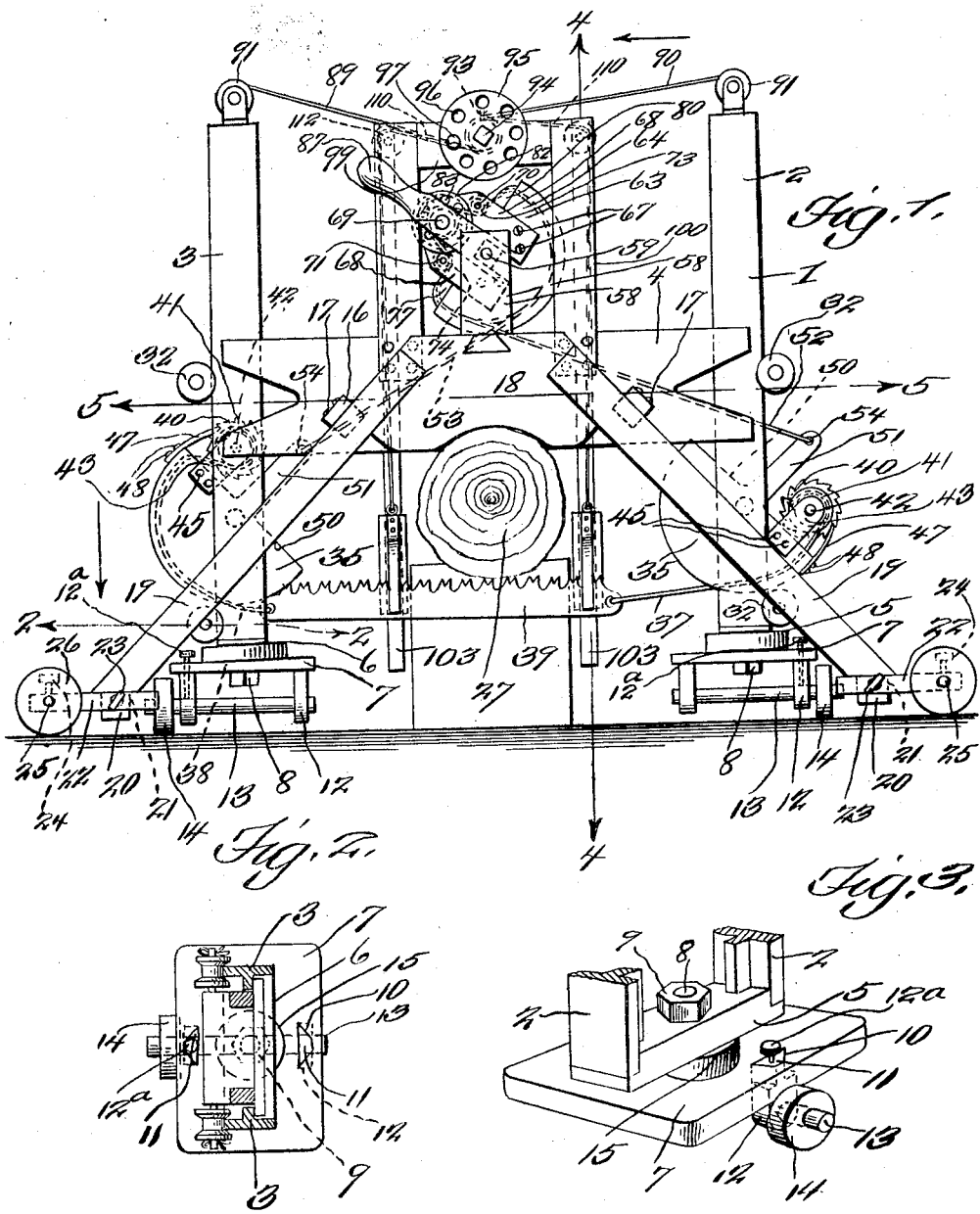

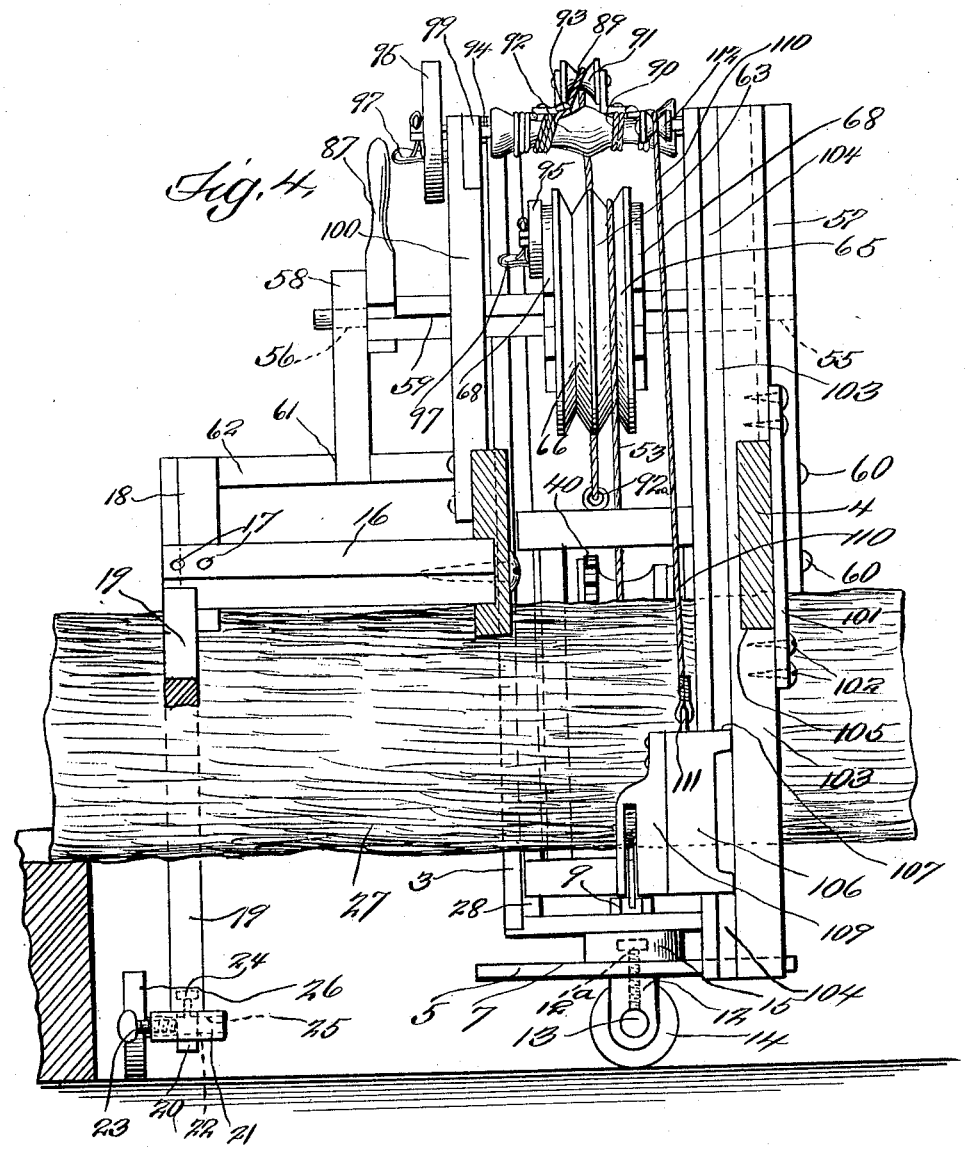

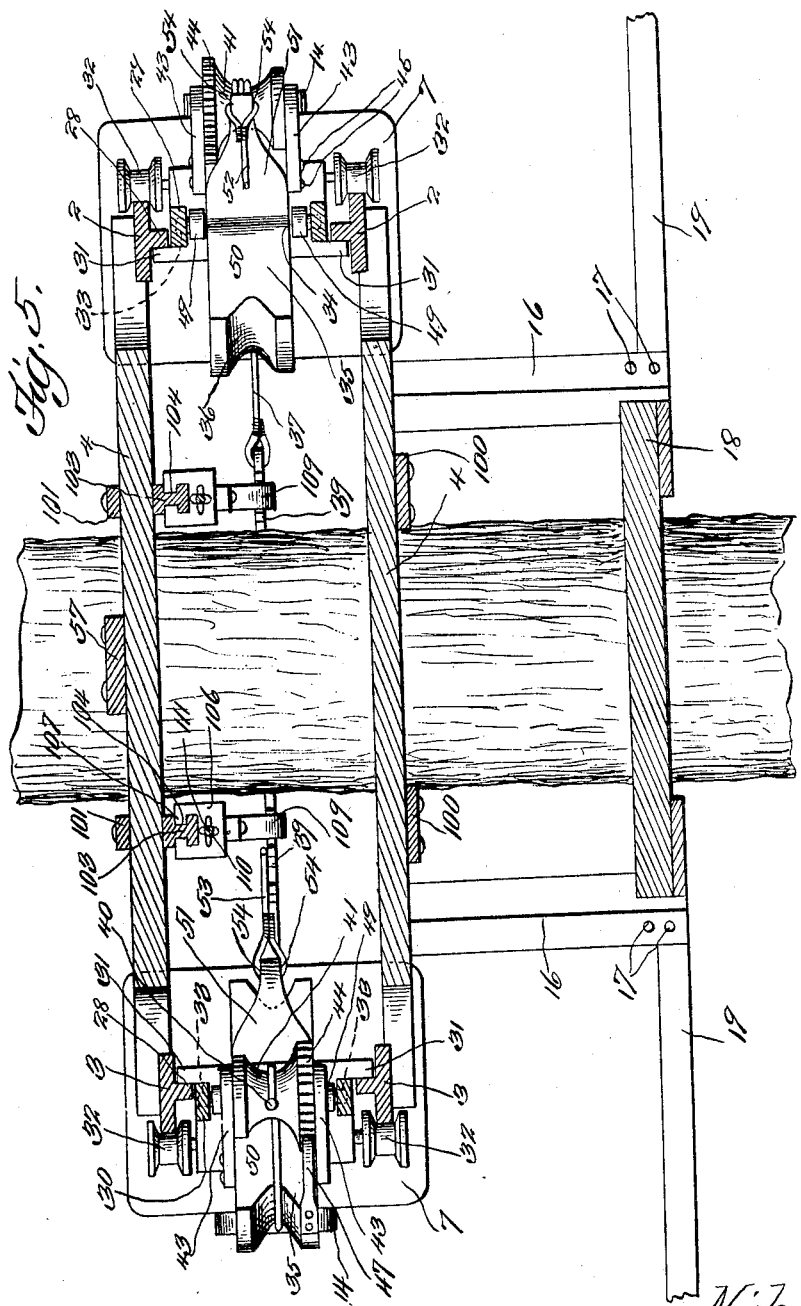

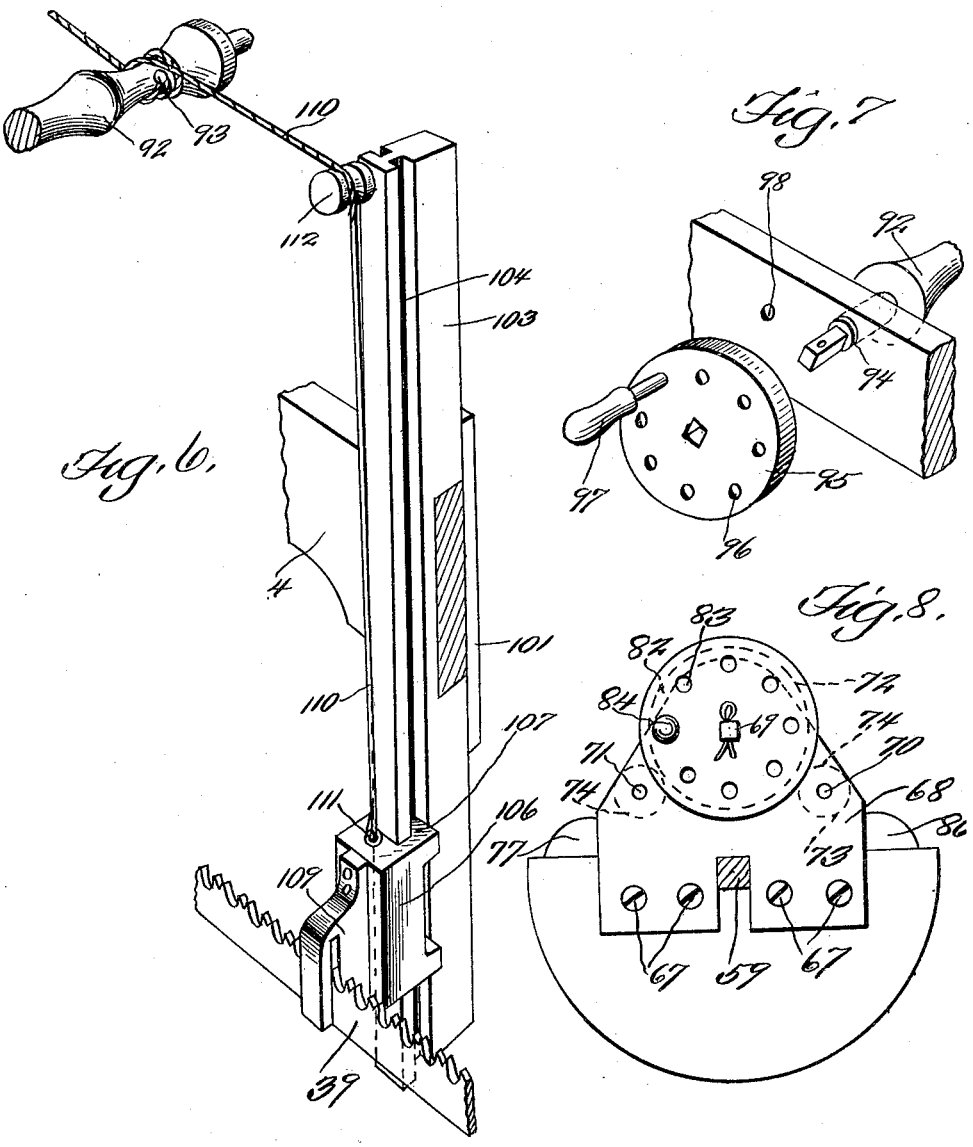

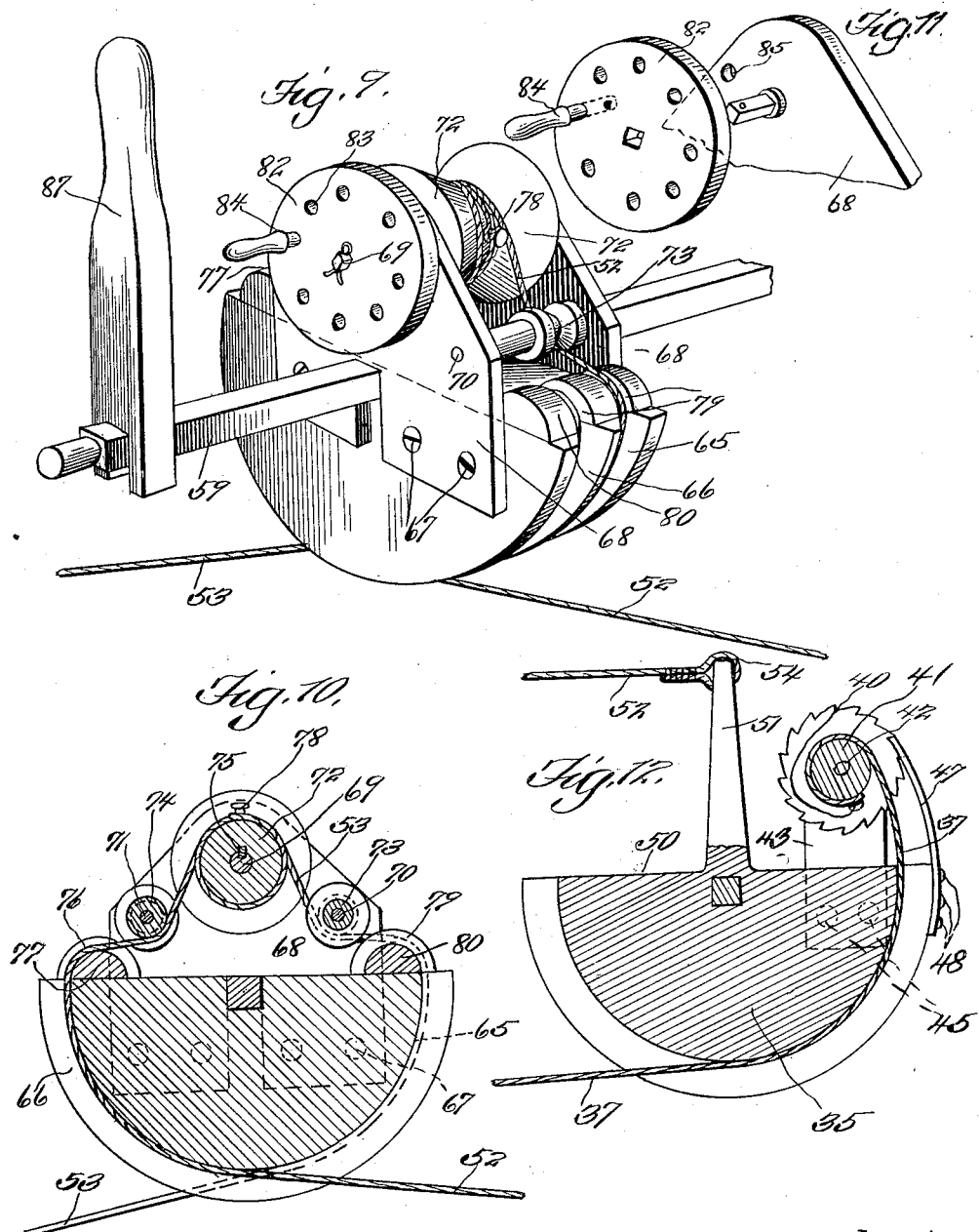

NIELS HANSEN, OF STANWOOD, WASHINGTON.

CROSSCUT-SAWING APPARATUS.

1,110,777. Specification of Letters Patent. Patented Sept. 15, 1914.

Application filed April 5, 1913. Serial No. 759,068.

*To all whom it may concern:*

Be it known that I, NIELS HANSEN, a citizen of the United States, residing at Stanwood, in the county of Snohomish and State of Washington, have invented a new and useful Crosscut-Sawing Apparatus; and I do hereby declare the following to be a full, clear, and exact description of the invention, such as will enable others skilled in the art to which it appertains to make and use the same.

This invention relates to that class of cross cut sawing apparatus, which is so constructed and operated in such wise and by a single operator, whereby a large saw may be reciprocated for cutting large logs and the like.

An object of the invention is to provide a portable sawing apparatus of this nature having a rocking shaft including a device thereon provided with cable connections with two rocking members (which oscillate correspondingly) between which a cross cut saw is connected. As the rocking members oscillate, the saw blade moves transversely of the log to be severed.

Another object of the invention is the provision of carriages vertically adjustable in guides of the frame of the apparatus, in which carriages the rocking members are mounted. By adjusting the carriages vertically, the saw blade is correspondingly adjusted, whereby a log may be completely severed.

Another object of the invention is the provision of a pair of saw guides vertically adjustable in order to accommodate the saw blade at all times.

Another object of the invention is the provision of means of tightening or loosening the cable connections between the rocking members and the device upon the rocking shaft.

Another object of the invention is to provide means for adjusting the cable connections between the rocking members and the saw blade.

The invention comprises further features and combination of parts, as hereinafter set forth, shown in the drawings and claimed.

In the drawings:—Figure 1 is a view in side elevation of the improved portable sawing apparatus. Fig. 2 is a sectional view on line 2—2 of Fig. 1. Fig. 3 is a detail perspective view of the lower portion of one end of the frame of the apparatus, showing the swiveled connections to a turn table (which is provided with rollers or wheels), for supporting the frame. Fig. 4 is a sectional view on line 4—4 of Fig. 1. Fig. 5 is a sectional view on line 5—5 of Fig. 1. Fig. 6 is a detail perspective view, showing the vertically adjustable saw guides. Fig. 7 is a detail perspective view showing a portion of the frame of the apparatus and a portion of a drum (about which the cable connections of the saw guide and the carriages are wound) and the means for holding the drum in adjusted positions. Fig. 8 is a view in side elevation of the rocking shaft including the rocking device. Fig. 9 is a detail perspective view of the rocking shaft including the rocking device, showing the means for loosening or tightening the cable connections between the rocking device and the oscillatory members. Fig. 10 is a sectional view through the rocking shaft and rocking device. Fig. 11 is a detail view of the means carried by the rocking device for holding the cable connections between the device and the oscillatory members adjusted. Fig. 12 is a sectional view through one of the oscillatory members.

Referring more especially to the drawings, 1 designates the frame of the improved sawing apparatus, which frame comprises the end standards 2 and 3 connected by the longitudinal bars 4. The lower ends of the standards 2 and 3 are connected by the transverse bars 5 and 6, to which the turn tables 7 are swiveled, by means of the bolts 8 having nuts 9. The turn tables 7 are provided with mortise openings 10 to receive the lugs 11 of the bearings 12, in which the shafts or axles 13 are journaled. Suitable rollers or wheels 14 are mounted upon the axles or shafts. Suitable washers 15 are interposed between the turn tables and the bars 5, whereby the turn tables may swivel easily. Extending laterally from one of the bars 4 are bars 16, which connect at 17 to an auxiliary supporting frame 18, comprising legs 19. These legs 19 extend angularly, and are provided with lugs 20 at their lower ends, which lugs are secured in mortised openings 21 of the plates 22, by means of the set screws 23. Secured in the plates 22 by suitable set screws 24 are axles 25 having wheels or rollers 26. By the provision of the turn tables and the rollers 14, and the plates 22 including the rollers or wheels 26, the apparatus is rendered portable or movable from place to place. In other words, the apparatus may be moved in such wise, as to straddle or arch a log or the like 27 to be severed or cut, as shown in Fig. 1.

The standards 2 and 3 are provided with guide ribs 28, by which the carriages 29 and 30 are vertically guided. The carriages 29 and 30 are provided with laterally extending lugs 31 and anti-frictional rollers or wheels 32. The lugs 31 engage the ribs 28, while the rollers 32 engage the standards.

Mounted in suitable bearing 33 of the carriages are shafts 34, on which the oscillatory or rocking members 35 are mounted. The oscillatory members 35 are in the form of semi-circular disks having grooves 36, which are engaged by the cable 37 and 38. One end of each cable 37 and 38 is connected to one end of the saw blade 39, while the other end of each cable is connected at 40 to a pulley 41. The pulleys 41 are journaled upon the pins 42 (which are mounted in the arms 43) and are provided with ratchet teeth 44. The arms 43 are secured at 45 to the sides of the semi-circular disks. In order to tighten or loosen the cables 37 and 38, the pulleys 41 may be partially rotated in one direction or the other, there being spring pawls 47 secured at 48 to the semi-circular disks, to engage the ratchet teeth of the pulleys, so as to hold the pulleys in adjusted positions. Suitable collars 49 are mounted upon the shafts 34, in order to hold the oscillatory or rocking members or semi-circular disks centered upon their shafts. Projecting radially from the flat portions 50 of the semi-circular disks are arms 51, to which the cables 52 and 53 are connected at 54.

Mounted in suitable bearings 55 and 56 of the bar 57 and the upwardly extending projection 58 is a rock shaft 59, which is rectangular in cross section. The bar 57 is secured to one of the bars 4 at 60, and supported thereby, while the projection 58 is mortised or otherwise connected at 61 to the cross piece 62 of the auxiliary frame 18.

Rockable or movable with the shaft 59, owing to its being rectangular in cross section, is a rocking device 63, which, as clearly shown in the drawings, especially Figs. 1, 9 and 10, is also in the form of a semi-circular disk 64 having two grooves 65 and 66. Secured to the sides of the disk 64 by the screws or other suitable means 67 are plates 68, in bearings of which the shafts 69, 70 and 71 are mounted. Pulleys 72, 73 and 74 are mounted upon the shafts 69, 70 and 71. The pulley 72 is keyed at 75 to rotate with the shaft 69. The cable 52 engages the groove 66 and also the groove 76 of the semi-circular block 77, and passes under the pulley 74, and is subsequently wound once about the pulleys 72 and connected to the pin 78; while the cable 53 engages the groove 65 and the groove 79 of the semi-circular block 80 and passes under the pulley 73. The cable 53 passes once about the pulley 72, and is subsequently secured to the pin 78. By rotating the pulley 72 in one direction or the other, the cables 52 and 53 may be loosened or tightened, relative to the cables 37 and 38. Also movable with the shaft 69 is a disk 82 having a series of annularly arranged apertures 83, into any one of which a pin 84 is insertable in order to enter the aperture 85 of one of the plates 68, whereby the pulley 72 and the disk 82 may be held in adjusted positions, it depending upon the tension desired of the cables 52 and 53. After the cables 38 and 37, and the cables 52 and 53 are tensioned as desired, a rocking motion may be imparted to the shaft 59, by oscillating the lever 87, which rocking device 63 in turn will pull the cables 52 and 53 backward and forward, thereby imparting oscillatory movements to the oscillatory members or disks 35, and owing to the cable connections 37 and 38, the saw blade 39 will receive a reciprocatory movement transversely of the log. As the saw blade cuts deeper through the log, it is adjusted vertically, owing to the cables 89 and 90, which pass over the pulleys 91 and are connected at 92ª to the carriages 29 and 30. In order to raise and lower the carriages, the cables 89 and 90 are passed about one end of the drum 92 in opposite directions and secured thereto, as at 93. The drum 92 moves with the shaft 94, one end of which has a disk 95 movable therewith. The disk 95 has a series of apertures 96, into any one of which the pin 97 is insertible. When the pin 97 is inserted in one of the apertures 96, it also enters the aperture 98 of the horizontal portion 99 of the upwardly extending supplemental frame 100, in order to hold the drum 92 in adjusted positions, thereby suitably supporting the carriages through the medium of the cables 89 and 90 in their adjusted positions.

Clamped or otherwise secured to one of the bars 4 by the plates 101 and the screws 102 are the vertical bars 103 having oppositely arranged longitudinal grooves 104. The vertical bars 3 are recessed to receive the bar 4, said recesses are designated by the numerals 105. Suitable blocks or members 106 having T-shaped openings 107 (which conform to the cross sectional contour of portions of the bars 103) are provided and guided by the grooves 104. Secured to and carried by the blocks or members 106 are saw blade guides 109 having slots to receive the saw blade. These guides 109 act to hold the blade in its proper plane, during its reciprocation, when cutting a log or the like, and as the saw cuts deeper in the log and is adjusted, the blocks or members 106 together with the saw guides 109 are correspondingly adjusted, by virtue of the cables 110, the lower ends of which connect at 111 to the blocks or members 106, while their upper portions are connected to and wound about one end of the drum 92. The cables 110 pass over the pulleys 112 of the vertical bars 103. As the carriages are adjusted, by operating the drum 92, the saw guides are likewise adjusted at the same time.

It is to be ascertained from the foregoing, there has been devised a novel and efficient cross cut sawing apparatus, which is portable or movable from place to place, for sawing logs in the forests or the like, and one which has been found essentially desirable and practical.

As will be observed there are only four wheels, on which the apparatus is mounted, one on each turn table 7, and one on each axle 25. These wheels move or rotate with the axles 25 and 13, which rotate in their bearings. The bearings 12 are provided with oil holes to receive the screws 12ª. When sawing logs singly or collectively the screws may be tightened against the axles 13, thereby preventing them from rotating, so as to prevent movement of the apparatus. It will be seen that in Fig. 1 the wheels 14 and 26 are disposed at right angles to each other, which likewise prevents movement of the apparatus. However, when it is desired to move the machine the turn tables 7 may be moved or partially rotated, so that the wheels 14 may move in the same direction as the wheels 26. The plates 22 also have oil holes, to receive the screws 24, which are provided for the purpose of preventing the axles 25 from turning, still further preventing the frame of the apparatus from moving. In lieu of sawing a single log, a plurality of small logs or the like may be bound together, by any suitable means, and the logs severed or cut simultaneously.

The invention having been set forth, what is claimed as new and useful is:—

1. In a log sawing apparatus, a saw blade mounted so as to be reciprocated, and a single rocking device having connections with each end of the saw blade for reciprocating the blade, said connections including oscillatory members, and means for adjusting the oscillatory members vertically.

2. In a log sawing apparatus, a frame having adjustable saw guides, a saw blade mounted in the guides so as to be reciprocated, a single rocking device mounted in bearings of the frame super-imposed above the saw, said frame having additional guides, oscillatory members adjustably mounted in said additional guides, one beyond each end of the saw, connections to the ends of the blade, which connections in turn are adjustably connected to the oscillatory members, additional connections to the upper portions of the oscillatory members, which additional connections are adjustably connected to the single rocking member, and means for adjusting the oscillatory members vertically.

In testimony whereof I have signed my name to this specification in the presence of two subscribing witnesses.

NIELS HANSEN.

Witnesses:
Geo. M. Mitchell,
E. L. Hogan.

---

Copies of this patent may be obtained for five cents each, by addressing the "Commissioner of Patents, Washington, D. C."